United States Patent [19]

Shonerd

[11] 4,257,399
[45] Mar. 24, 1981

[54] HYDRO-SOLAR SYSTEM FOR HEATING AND COOLING

[76] Inventor: David E. Shonerd, 6 Golden State, Rancho Mirage, Calif. 92270

[21] Appl. No.: 959,607

[22] Filed: Nov. 13, 1978

[51] Int. Cl.³ .............................................. F24J 3/02
[52] U.S. Cl. .................................. 126/429; 126/419; 126/430; 126/436; 126/437
[58] Field of Search ............... 126/419, 422, 425, 429, 126/430, 436, 437, 435, 448

[56] References Cited

U.S. PATENT DOCUMENTS

| | | | |
|---|---|---|---|
| 3,250,269 | 5/1966 | Sherock | 126/435 |
| 3,254,703 | 6/1966 | Thomason | 126/435 |
| 3,262,493 | 7/1966 | Hervey | 126/428 |
| 3,369,540 | 2/1968 | Meckler | 126/435 |
| 3,993,041 | 11/1976 | Diggs | 126/435 |
| 3,994,276 | 11/1976 | Pulver | 126/429 |
| 3,996,919 | 12/1976 | Hepp | 126/429 |
| 4,029,081 | 6/1977 | Strong | 126/429 |
| 4,030,478 | 6/1977 | Beaver | 126/448 |
| 4,060,072 | 11/1977 | Johnson | 126/448 |
| 4,119,143 | 10/1978 | Robinson | 126/437 |

*Primary Examiner*—James C. Yeung
*Assistant Examiner*—Daniel O'Connor
*Attorney, Agent, or Firm*—Ralph B. Pastoriza

[57] ABSTRACT

The system makes use of a plurality of side-by-side parallel water troughs for exposing water in the troughs to solar radiation as well as the night sky. The troughs are arranged to be positioned on either a flat roof or a pitched roof. Water storage tanks in side-by-side spaced relationship are positioned beneath the water troughs and appropriate pumps provided for transferring water between the troughs and the water storage tanks. Air ducts in turn are defined between the storage tanks so that the ducts have common walls with the storage tank to effect efficient heat transfer between air in the ducts and water in the storage tanks. Heating of rooms is accomplished by transferring water from the troughs at sundown to the storage tanks, the heat accumulated during the daylight hours being transferred to air in the ducts which air is then directed to one or more rooms. Cooling is accomplished by transferring water in the troughs which has been exposed only to the night sky to lose heat by radiation, the transferred cooled water in the storage tanks taking heat from the air in the ducts to cool the air and thus rooms to which the air is directed. A fan may be provided to increase air circulation for high heating and high cooling.

3 Claims, 4 Drawing Figures

HYDRO-SOLAR SYSTEM FOR HEATING AND COOLING

This invention relates generally to solar heating and cooling systems for homes or office buildings and more particularly to a hybrid between a totally passive system and active system for effecting such heating and cooling.

BACKGROUND OF THE INVENTION

There is increasing interest in the application of solar energy for widespread consumer use. Solar hot water units are becoming accepted, but home heating and cooling systems are still rarely used as of this time. The high initial cost and complexity of active systems may preclude large scale use for many years to come.

Passive systems for heating and cooling of buildings use a minimum of mechanical power to collect or distribute solar energy. One example is the passive roof pond which has been used in flat roof homes in the Southwestern United States. The simplicity of the passive roof pond usually results in a more reliable and less expensive solar system than the active systems with their complex heat exchangers, collectors and pumps.

One problem with passive system of the roof pond type is the fact they are only applicable to flat roofs. It would certainly constitute a forward step in the art if the principles of passive systems could be utilized in homes having pitched roofs. Such a system avoids the expense inherent in active systems and yet would not destroy the architectural features of the home or other building utilizing such a system.

BRIEF DESCRIPTION OF THE PRESENT INVENTION

The present invention constitutes a hybrid solar heating and cooling system between the completely passive systems and active systems presently available. The design is such that the advantages of predominantly passive systems are realized insofar as avoidance of expensive auxiliary equipment is concerned, and yet the structure and design is such that the system can be used on either flat roofs or sloping or pitched roofs.

The basic component of the system takes the form of an integral body formed, for example, from rigid polyurethane. This body is provided with a plurality of side-by-side parallel cut-outs on one surface defining water troughs. The arrangement is such that when the troughs are at least partially filled with water, the body can be tilted with water still retained in the troughs so that the body can be used either on a flat roof or pitched roof for exposing the water in the troughs to radiation from the sun; or, exposing the water in the troughs to the night sky for radiation of heat from the water.

The preferred embodiment of the system includes further cut-outs formed on the underside of the body to define air passages. Water storage tanks in turn are positioned in side-by-side spaced relationship to define air ducts between the tanks. These air ducts communicate with the air passages and an appropriate pump means is provided for transferring water between the water troughs and storage tanks. Heat transfer takes place between water in the storage tank and the air in the ducts so that either heated or cooled air as the case may be can be directed to one or more rooms beneath a roof supporting the body defining the water troughs to heat or cool the rooms.

By the foregoing arrangement, great flexibility is provided in that either heated or cooled air effects actual control of room temperatures. Moreover, the structure can be used on either flat roofs or pitched roofs so that improved architectural appearance results.

BRIEF DESCRIPTION OF THE DRAWINGS

A better understanding of this invention as well as many further features and advantages thereof will be had by now referring to the accompanying drawings in which.

DETAILED DESCRIPTION OF THE PREFERRED EMBODIMENT

Figure 1:
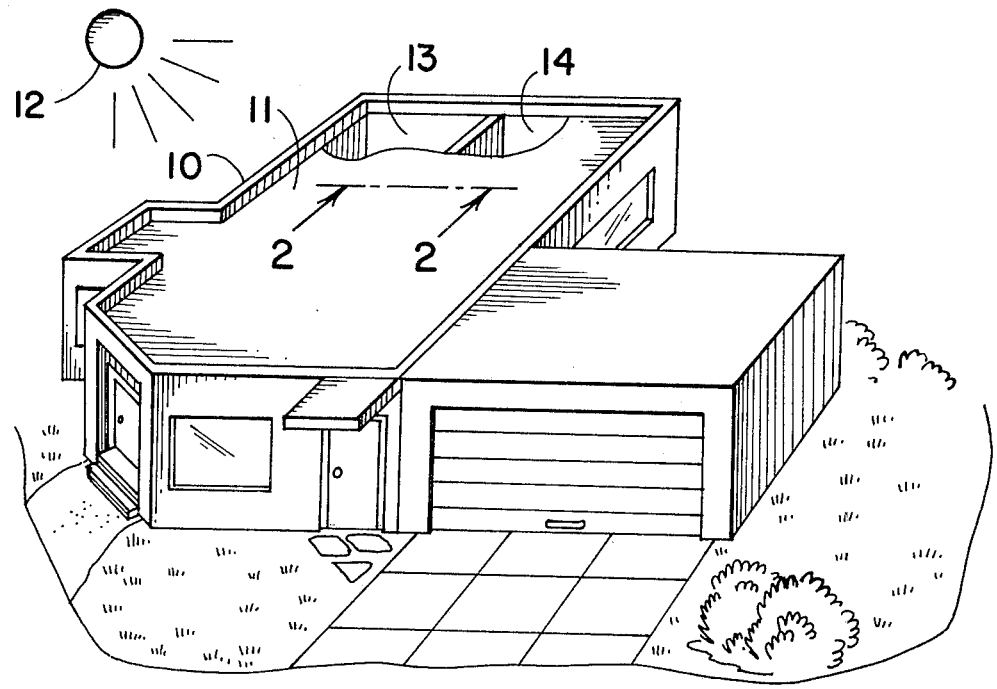
FIG. 1 is a perspective view partly broken away of a typical building such as a residential home wherein the hydro-solar system for heating and cooling of rooms in the building is utilized.

Referring first to FIG. 1 there is shown a typical building 10 which might be a residential home or a small office building having a flat topped roof 11 exposed to solar radiation from the sun 12. Part of the roof structure 11 is broken away to expose individual rooms 13 and 14 in the building 10.

The hydro-solar system of this invention, in the particular embodiment to be described, is wholly incorporated in the roof 11 of the structure shown in FIG. 1.

Figure 2:
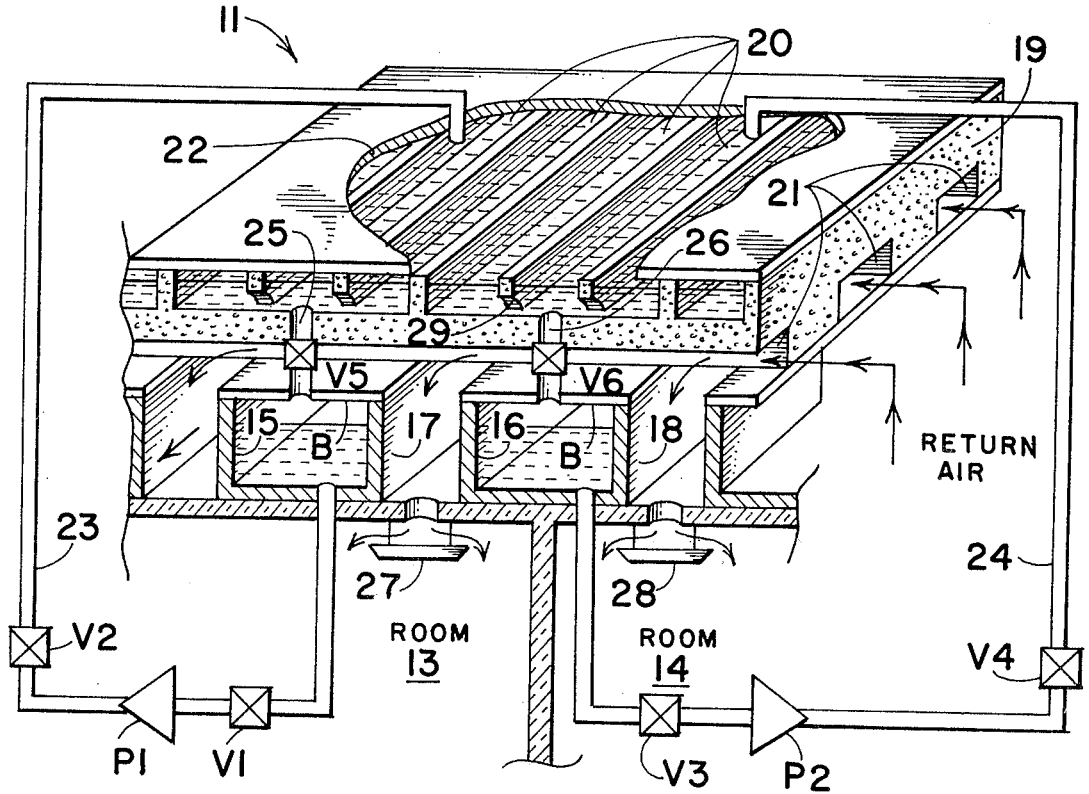
FIG. 2 is a greatly enlarged fragmentary cut-away view partly in perspective of a portion of the system for heating and cooling taken in the direction of the arrows 2—2 of FIG. 1.

Referring now to the fragmentary view of FIG. 2, this system includes at least one and preferably a plurality of water storage tanks shown in the central portion of FIG. 2 at 15 and 16 by way of example. These storage tanks are disposed above the ceiling of the rooms of the building and below the roof in side-by-side spaced relationship.

Between the tanks are defined air ducts indicated at 17 and 18. Each of these air ducts has at least one common wall with the adjacent water storage tank so that heat transfer can take place by conduction between water in the tank and air in the duct. Vapor barriers B may be provided for the tanks.

Disposed above the storage tanks is an integral body 19, preferably of rigid polyurethane foam, including parallel cut-outs on its top surface defining a plurality of open elongated shallow water troughs 20. The underside of the body 19, in turn, includes further cut-outs defining air passages 21. These air passages are in communication with the air ducts such as the air ducts 17 and 18 as indicated in FIG. 2.

Covering the upper exposed portions of the water troughs is a thin plastic cover sheet 22 which might comprise, for example, five mil. thick Mylar. This plastic cover sheet provides a "greenhouse" effect to aid in the retention of heat in the water of the troughs when exposed to solar radiation. Appropriate pump, valve and conduit means are provided for transferring water between the storage tanks and troughs. In the particular embodiment illustrated in FIG. 2, the pump, valve and conduit means are illustrated schematically and might comprise, for example, a pump P1 with appropriate control valves V1 and V2 for transferring water from the water storage tank 15 to one of the several water troughs 20 as by way of conduit 23.

Also illustrated in FIG. 2 is a second pump P2 with associated valves V3 and V4 for transferring water from the water storage tank 16 to others of the troughs 20 as by way of conduit 24.

Water in the troughs themselves, in turn, may return to the storage tanks 15 and 16 by way of conduits 25 and 26 provided with appropriate control valves V5 and V6 as shown in the central portion of FIG. 2.

Air dampers are schematically illustrated at 27 and 28 below openings in the air ducts 17 and 18 leading into separate rooms such as the rooms designated 13 and 14 described in FIG. 1. The air flow is indicated by the arrows, return air passing into the air passages 21 as indicated.

In the specific embodiment of FIG. 2 wherein a flat roof is used, the water troughs may be manifolded or interconnected as by means of small ports such as indicated at 29 so that it is only necessary to return water from the storage tank to one of the troughs and it will fill all of those troughs connected by such ports. However, it may be desirable to have different temperature controls for separate rooms or to cool one room while heating another.

In the foregoing latter event, certain of these water troughs 20 only would be manifolded together or connected by ports to form a group, this group being associated with a distinct water storage tank. A separate pump and valve means would be provided so that the same could be operated independently of the other water troughs and storage tanks. This situation is depicted in FIG. 2 wherein the water storage tank 16 and ported troughs 20 in communication with the conduit 24 could be used for controlling the temperature of the room 14 while the other storage tank 15 and troughs 20 associated with the conduit 23 would be used for controlling the temperature of the room 13.

Of course, if a single room or all of the rooms in a building are to be treated uniformly, where a flat roof is employed, all of the troughs 20 could be ported or manifolded to be in communication with each other and similarly, all of the water storage tanks such as 15 and 16 could be manifolded together. There would then be required only a single pump for water transfer between the troughs and storage tanks.

The unique design of the basic components of this system in the form of the water troughs 20 described in FIG. 2 renders it possible to utilize the hydro-solar system on a pitched roof. Such an installation is depicted in the fragmentary cross-section of FIG. 3.

Figure 3:
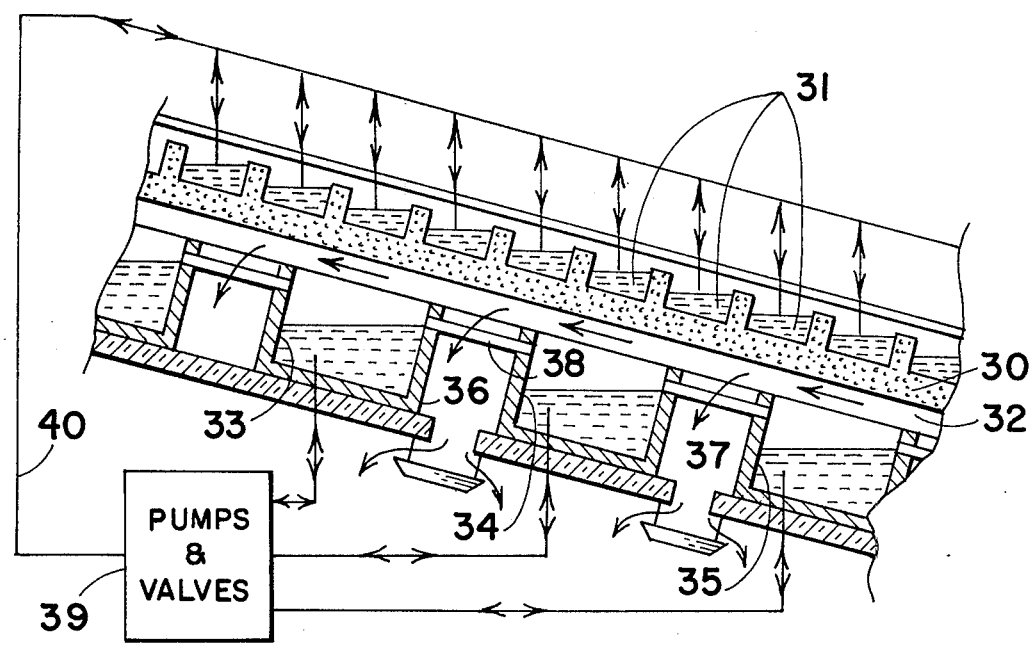
FIG. 3 is a fragmentary cross section of the system as it would be employed on a pitched roof.

Referring specifically to FIG. 3, the various water troughs are defined by cut-outs on the top surface of a rigid integral foam body 30, these troughs being indicated at 31. Similarly, air passages are provided by cut-outs such as indicated at 32 on the other side of the body 30. Water storage tanks in turn beneath the body 30 are illustrated at 33, 34 and 35 defining therebetween air ducts such as indicated at 36 and 37. These air ducts are in communication with the air passage 32 as in the case described in FIG. 2.

The basic structure in the form of the rigid polyurethane body 30 defining the water troughs and air passages and the water storage tanks and air ducts can all be essentially indentical to that described in FIG. 2 except that the same are inclined at an angle to correspond to a pitched roof. The only difference between the embodiment of FIG. 3 and that of FIG. 2 is that none of the water troughs would be in communication with each other or manifolded as by means of ports. Rather, each one would be independent so that each could still contain water even though at an inclination or used on a pitched roof. Each of the storage tanks in turn would be connected to the other through an appropriate overflow pipe such as indicated at 38 between the storage tanks 36 and 37. Otherwise, there would be no manifolding between water storage tanks.

It will be evident in FIG. 3 that water can be retained readily in the troughs and tanks even though the same are inclined.

In order to effect transfer of water between the storage tanks and troughs, individual conduits would be required communicating with the individual troughs and the individual storage tanks. Appropriate pumps and valves indicated by the block 39 could effect the desired transfer as by means of various conduits depicted by solid lines, one of which is illustrated at 40. The double arrows indicate that transfer can take place from the water troughs to the storage tanks or from the storage tanks to the water troughs.

Figure 4:
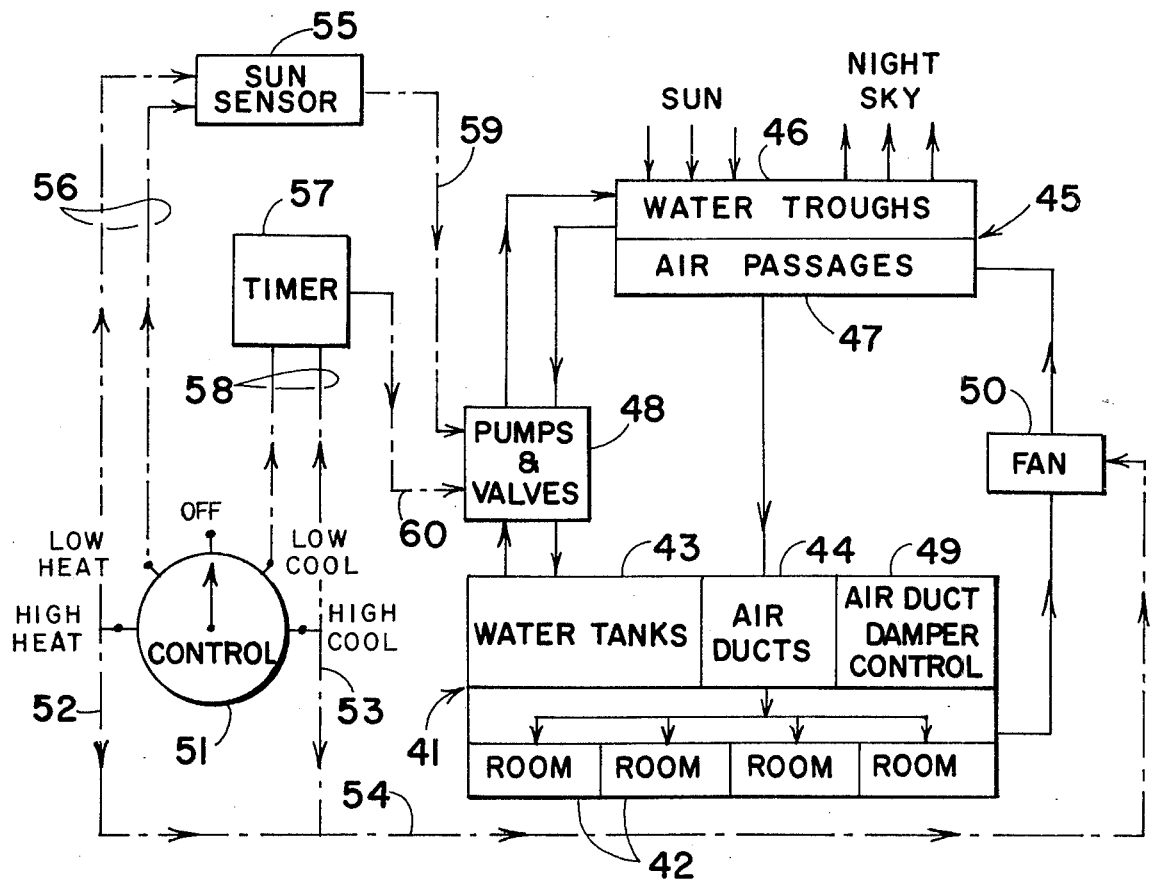
FIG. 4 is a functional block diagram of the overall system useful in explaining its operation.

FIG. 4 is a simple functional block diagram of the overall system. Referring to the lower portion the large block 41 indicates a building provided with several rooms 42. Appropriate water storage tanks indicated by the block 43 are positioned in the roof of the building with appropriate air ducts indicated by the block 44 arranged as described in FIGS. 2 and 3. The rigid polyurethane body is shown at 45 defining the water troughs indicated at 46 and the air passages indicated at 47, these air passages being in communication with the air ducts 44 indicated by the single vertical line. Air in the air ducts 44 is distributed to the various rooms 42 as depicted by the lines and arrows.

Block 48 indicates the various pumps and valves for transferring water between the water troughs 46 and water storage tanks 43. A block 49 in turn shown next to the air ducts 44 depicts air duct damper controls so that air can be channeled to one or more rooms wherein concentrated heating or cooling might be desired. In addition, a fan 50 may be placed in the return air lines from the various rooms to the air passages for increasing air flow and thus heating or cooling ability all as will become clearer as the description proceeds.

Referring now to the left hand portion of FIG. 4, there are illustrated, merely by way of example, appropriate controls for the hydro-solar system described. Thus, there is shown a basic manual control 51 having an off position, a low heat position, a high heat position, a low cool position and a high cool position. The high heat and high cool positions are connected as by lines 52 and 53 respectively to a common line 54 connecting to the fan 50 so that when the control is in either of these positions, the fan 50 is energized. A sun sensor 55 shown in the top left portion of FIG. 4 in turn connects to the low heat and high heat positions as by lines 56 while a timer 57 connects to the low cool and high cool positions as by lines 58. The sun sensor and timer control the pumps and valves 48 by way of lines 59 and 60 respectively.

OPERATION

With reference to the drawings, particularly FIG. 4, the operation of this system will become evident. Assume first that it is autumn or a mild winter climate and only low heat is required. In this event, the control 51 will be set on the low heat position. In this position, the sun sensor 55 will be activated in such a manner as to turn on the pumps and necessary valves at sun-up to transfer water from the storage tanks 43 to the water troughs 46. The water in the water troughs will remain exposed to the sun during daytime, thereby becoming heated. At sundown, the sun sensor depicting this condition will again operate the appropriate pumps and valves to return water from the water troughs to the storage tanks. This water will now be in a heated condition and by conduction will transfer such heat to air in the air ducts 44. This air will pass to the various rooms 42 to provide a low heat. The water troughs will remain empty during the nighttime but at sun-up the next day, the sun sensor will again energize the appropriate pumps and valves to transfer the now cooled water in the water tanks 43 back to the water troughs where it will again be exposed to solar radiation and thus heated.

In the event high heat is desired, the control 51 is turned to high heat and the same events described will take place except that the fan 50 will also be energized to increase air flow and heat transfer and thus provide more quickly heat for the various rooms.

In the event it is spring or summer and a fairly mild climate and only low cooling conditions are deemed essential, the control 51 is placed on low cool. In this position, the timer 57 is actuated to cause appropriate pumps and valves in the block 48 to transfer water from the tanks 43 to the water troughs 46 at sundown so that the water will remain in the troughs throughout the night. Any heat in this water will be radiated to the night sky. The timer will then again actuate the appropriate pumps and valves to return water from the water troughs to the water tanks 43 wherein heat in the air passing through the air ducts will be transferred to the cooled water in the water tanks so that the air itself is cooled for cooling the rooms. The water troughs will remain empty during the daytime.

If high cooling is desired, the control 51 in being positioned on high cool will cause the foregoing operations to take place except that the fan 50 will also be energized to accelerate heat transfer between the air in the ducts and the water in the water tanks.

It should be understood that heating and cooling in the rooms takes place both by convection resulting from the air circulation, conduction between the storage tanks and ceiling of the rooms and radiation from the ceiling, these storage tanks being positioned directly above the ceiling as illustrated. It should also be understood that the present system can be used with auxiliary heater or air conditioning systems which may be set to turn on with a separate thermostat. The air from such auxiliary units will be blown through the same labyrinth air ducts and will heat or cool the stored water as well as the building for improved energy conservation.

In a typical system, the water storage tanks might be 7½ inches high, 9½ inches wide and 16 feet long. The tanks themselves would be made of 18-gauge galvanized steel to thereby provide excellent thermal conductivity through its walls. While not essential, if a vapor barrier is used, it could constitute five mil. thick polyethylene film.

The body defining the water troughs and air passages would comprise a six inch thick, 2½ lb. density rigid polyurethane foam. The water troughs themselves would be two inches wide by 1½ inches deep and could run for the length of a typical roof; for example, ten to thirty feet. The plastic cover shown at 22 in FIG. 2 could be a five mil. thick Mylar as described.

For a 1500 sq. ft. home, the total water storage capacity would be about 800 cu. ft. The capacity of the water troughs would be 100 cu. ft. so that the stored water could be pumped eight times through the labyrinth during a typical eight-hour heating or cooling cycle at a pumping rate of 12 gallons per minute. A pump of approximately 1/300 H.P. would be required to pump 12 gallons per minute to a head of one ft.

Numerous advantages are inherent in the system of the present invention as compared to available prior art systems. These may be briefly summarized as follows:

1. Initial insulation costs through the use of standard building practices are substantially lower since complicated heat exchangers, collectors, pumps, floating components and necessary auxiliary equipment to move the same are avoided.

2. Longer life and lower maintenance is assured since the entire system is essentially passive.

3. Improved efficiency is realizable through the use of the integral polyurethane foam body defining the air/water labyrinth in which heat transfer from the storage tanks to the room air is accomplished by conduction, convection and radiation in a manner which is independent of the temperature gradient commonly existing in prior art roof ponds.

4. Improved architectural appearance is possible since the water trough approach can be used with pitched roofs.

5. Greater flexibility of temperature control is possible since specific rooms or areas in a building can be in a heating mode while others can be in a cooling mode.

From all of the foregoing, it will thus be evident that the present invention has provided an improved solar heating and cooling system readily adaptable to commercial buildings or residential homes.

I claim:

1. A hydro-solar system for heating and cooling rooms in a building, including, in combination:
    (a) water storage tanks in side by side relationship;
    (b) means defining air ducts between the tanks communicating with said rooms and having common walls with said water storage tanks so that heat transfer takes place by conduction between water in the tanks and air in the ducts, the tanks and ducts being above the ceilings of the rooms below the roof of the building;
    (c) a plurality of open elongated shallow water troughs on the building roof in side by side parallel relationship exposed to heat radiation from the sun;
    (d) a thin cover sheet overlying said troughs so that water in the troughs is heated by thermal energy from the sun;
    (e) pump, valve and conduit means interconnecting the storage tanks and troughs;
    (f) a fan and air passage means for increasing air flow from the rooms through the air ducts and back to the rooms when high heating and high cooling are desired;
    (g) control means for periodically transferring water from said storage tanks to said troughs and back to said storage tanks, said control means defining an off position, a low heat position, a high heat position, a low cool position and a high cool position;
    (h) a sun sensor;
    (i) a timer; and,
    (j) connecting lines between the various positions on said control means, the sun sensor, timer, pump and value means and fan such that when the control means is set to either the high heat or high cool position, the fan is energized to increase air circulation to the air ducts and when the control means is set on either the low heat or low cool positions, the fan is turned off, the sun sensor controlling the pump and valve means to transfer water from the storage tanks to the water troughs at sun-up and transfer water from the water troughs to the storage tanks at sundown; and the timer means functioning to pass water from the storage tanks to the troughs at sundown and thence transfer water from the troughs to the storage tanks at sun-up, the sun sensor being activated when the control means is in either the low heat or high heat positions and the timer being actuated when the control means is in either the low cool or high cool positions, whereby water in said troughs heated by solar radiation during the day can be transferred to the storage tanks at sundown by the control means, the heat therein being transferred to air in the ducts to provide heated air for the rooms during the night, and whereby water in said troughs cooled by heat radiation therefrom into the night sky during the night can be transferred to the storage tanks at sun-up by the control means, heat in the air in the ducts being transferred to the water in the tanks to provide cooled air for the rooms during the day.

2. A system according to claim 1, in which successive side-by-side troughs are at increasing levels so that a large area of a pitched roof can be used to support the troughs with water still contained in each trough.

3. A system according to claim 1, including damper control means for said air ducts so that air from several of the ducts can be channeled to one room to provide increased heating and cooling of said one room.

* * * * *